US007229511B2

(12) United States Patent
Cortigiano, Sr.

(10) Patent No.: US 7,229,511 B2
(45) Date of Patent: Jun. 12, 2007

(54) METHOD AND APPARATUS FOR FEEDING SLIDER-ZIPPER ASSEMBLIES

(75) Inventor: Ronald Cortigiano, Sr., Toccoa, GA (US)

(73) Assignee: Illinois Tool Works Inc., Glenview, IL (US)

( * ) Notice: Subject to any disclaimer, the term of this patent is extended or adjusted under 35 U.S.C. 154(b) by 485 days.

(21) Appl. No.: 10/820,242

(22) Filed: Apr. 6, 2004

(65) Prior Publication Data

US 2005/0133142 A1 Jun. 23, 2005

Related U.S. Application Data

(62) Division of application No. 10/021,230, filed on Oct. 30, 2001, now Pat. No. 6,732,898.

(51) Int. Cl.
*B32B 37/00* (2006.01)

(52) U.S. Cl. ............................ 156/66; 29/766; 29/408

(58) Field of Classification Search .................. 156/66; 29/766, 408
See application file for complete search history.

(56) References Cited

U.S. PATENT DOCUMENTS 3,853,671 A 12/1974 Ausnit
4,704,842 A 11/1987 Boeckmann et al.
4,878,987 A 11/1989 Ven Erden
4,915,284 A 4/1990 Goda
5,114,057 A * 5/1992 Ishikawa ..................... 29/766
5,208,970 A * 5/1993 Ishikawa ..................... 29/766
6,131,370 A 10/2000 Ausnit
6,212,857 B1 4/2001 Van Erden
6,327,837 B1 12/2001 Van Erden
6,360,513 B1 3/2002 Strand et al.
6,601,370 B2 8/2003 Colombo et al.

* cited by examiner

*Primary Examiner*—Jeff H. Aftergut
(74) *Attorney, Agent, or Firm*—Ostrager Chong Flaherty & Broitman P.C.

(57) ABSTRACT

A method and an apparatus for automatically feeding slider-zipper assemblies to a station where the slider-zipper assemblies can be attached to bag material such as thermoplastic film. The apparatus includes a slider guide having a channel running the length thereof. The channel has a cross section that allows passage therethrough of sliders slidably mounted to a tape of connected slider-zipper assemblies. A tape drive mechanism is located at the outlet of the slider guide. The tape drive mechanism includes a pair of rollers that form a nip therebetween. The zipper flanges of the tape are threaded through the nip. The rollers have respective grooves that form a space for passage of the sliders as the tape is advanced by the rollers.

10 Claims, 5 Drawing Sheets

METHOD AND APPARATUS FOR FEEDING SLIDER-ZIPPER ASSEMBLIES

This application is a divisional of and claims priority from U.S. patent application Ser. No. 10/021,230, now U.S. Pat. No. 6,732,898, filed on Oct. 30, 2001.

FIELD OF THE INVENTION

The present invention relates to methods and apparatuses for automated manufacture of a reclosable plastic package having a resealable closure, especially as part of a form, fill and seal process. In particular, the invention relates to methods and apparatuses for manufacturing reclosable plastic packages and bags having a slider-zipper assembly installed in the mouth of the package.

BACKGROUND OF THE INVENTION

In the use of plastic bags and packages, particularly for foodstuffs, it is important that the bag be hermetically sealed until the purchaser acquires the product, takes it home, and opens the bag or package for the first time. It is then commercially attractive and useful for the consumer that the bag or package be reclosable so that its contents may be protected. Flexible plastic zippers have proven to be excellent for reclosable bags, because they may be manufactured with high-speed equipment and are reliable for repeated reuse.

A typical zipper comprises one fastener strip or member having a groove and attached to one side of the bag mouth, and another fastener strip or member having a rib and attached to the other side of the bag mouth, which rib may interlock into the groove when the sides of the mouth of the bag are pressed together. Alternatively, a fastener strip having a plurality of ribs may be on one side of the bag mouth, while a fastener strip having a plurality of grooves or channels may be on the other side, the ribs locking into the channels when the sides of the mouth of the bag are pressed together. In the latter case, there may be no difference in appearance between the two fastener strips, as the ribs may simply be the intervals between channels on a strip that may lock into another of the same kind. In general, and in short, some form of male/female interengagement is used to join the two sides of the bag mouth together. The fastener strips or members are bonded in some manner to the material from which the bags themselves are manufactured.

In the automated manufacture of plastic reclosable packages or bags, it is known to feed a zipper assembly to a position adjacent a sheet of thermoplastic film and then attach the zipper assembly to the bag by means of heat sealing. The zipper assemblies are attached at spaced intervals along the thermoplastic sheet, one zipper assembly being attached to each section of film respectively corresponding to an individual package or bag. The zipper assembly consists of two interlocking fastener strips that, in the final package, lie inside the mouth of the package. Each fastener strip preferably has a flange that extends toward the product side of the package in a direction transverse to the line of the zipper. In accordance with one known method of feeding zipper assemblies to an automated form, fill and seal machine, the zipper assembly is in the form of a tape which is unwound from a spool for automated feeding. The tape comprises a continuous length of interlocked fastener strips. The continuous tape is feed to a cutting device that cuts the tape at regular lengths to form an individual zipper. Each individual zipper is then attached to the thermoplastic film by heat sealing or other suitable means.

Prior to cutting and heat sealing, the zipper assembly must be automatically positioned correctly relative to the thermoplastic film. Moving the zipper assembly into position overlying the thermoplastic film requires a positioning device. Some prior art positioning devices comprise a channel which guides the continuous zipper tape toward its proper position relative to the direction of movement of the thermoplastic film. The zipper assembly may be positioned parallel or perpendicular to direction of movement of the thermoplastic film. Because the fastener strips of the zipper assembly have a constant profile in the lengthwise direction, it is a relatively simple matter to design a linear guide channel having a cross section which matches the profile of the interlocked fastener strips with sufficient clearance to allow the zipper tape to be pushed or pulled through the guide with minimal friction, yet not so great as to allow the zipper tape to skew, twist or move sideways in the guide channel.

Other types of reclosable plastic bags, however, contain a slider that facilitates a consumer opening and re-closing the package by disengaging and re-engaging the two sides of the zipper together. However, adding a slider to the zipper assembly requires the design of guide devices different than those used when reclosable packages having zippers without sliders are being manufactured.

In the prior art it is known to feed a continuous tape of interlocked faster strips to a shaping device which crushes the strips at regular intervals in the lengthwise direction to provide restraints or stops for the slider. At the next station, a slider insertion device inserts a respective slider onto each section of zipper tape between successive slider stops. The slider can be slid along the zipper tape between a leftmost position in abutment with the left-hand slider stop and a rightmost position in abutment with the right-hand slider stop. The resulting tape of slider-zipper assemblies must be fed automatically to a station where each slider-zipper assembly will be cut off the end of the tape and then attached to a respective section of the thermoplastic bag material, e.g., by heat sealing, such sections of thermoplastic bag material being spaced at package intervals.

There is a need for a method and an apparatus for guiding a tape of slider-zipper assemblies to a desired position overlying the thermoplastic film during automated feeding of the slider-zipper assemblies. The apparatus must take into account that the slider are intermittently placed along the continuous zipper tape and have width and height dimensions greater than the corresponding dimensions of the interlocked members of the zipper fastener strips.

SUMMARY OF THE INVENTION

The present invention is directed to a method and an apparatus for automatically feeding slider-zipper assemblies to a station where the slider-zipper assemblies can be attached to bag material, such as thermoplastic film. The apparatus includes a slider guide having a channel running the length thereof. The channel has a cross section that allows passage of sliders slidably mounted to a tape of connected slider-zipper assemblies. The slider guide also has an opening in and along one side that communicates with the channel in which the sliders travel. The opening is arranged so that the flanges of the zipper tape penetrate and protrude out of the opening when the corresponding sections of the zipper interlocking members and associated sliders are resident in the channel.

In accordance with the preferred embodiment of the invention, a slider tape drive assembly comprises a slider guide and a tape drive mechanism. The tape drive mechanism comprises a nip roller and an idler roller having faces that meet squarely to form a nip. The zipper flanges of the tape are threaded through the nip. The nip and idler rollers have respective mutually aligned grooves that form a space for passage of the sliders between the rollers as the tape is advanced by the rollers. The rollers surfaces, which form the aligned grooves also, serve to guide each slider exiting the slider guide during tape advancement. The outlet of the slider guide is generally aligned with the space formed by the aforementioned grooves in the nip and idler rollers.

In accordance with the preferred embodiment of the invention, the apparatus further comprises: first and second mounting plates; first and second bearings respectively mounted to the first and second mounting plates and supporting the idler roller; and a guide plate mounted to the first and second mounting plates and having a guide surface disposed to guide zipper flanges of the tape toward said nip. The slider guide preferably comprises upper and lower slider guides. The lower slider guide is mounted to the guide plate, while the upper slider guide is mounted to the lower slider guide.

Other aspects of the invention are disclosed and claimed below.

DETAILED DESCRIPTION OF THE PREFERRED EMBODIMENTS

The present invention can be utilized in conjunction with many different methods of packaging product in a reclosable plastic package or bag. In particular, the invention has application in automated lines or machines which form a package, fill it with product, and then seal the product inside the package using any one of the known form-fill-seal (FFS) methods, such as HFFS (horizontal form-fill-seal), VFFS (vertical form-fill-seal) with the zipper applied in either the machine or transverse direction, or HFVFS (horizontal form/vertical fill-seal). In general, the conventional methods of packaging product using a form, fill and seal automated process comprise the following steps: attaching one zipper assembly to the packaging film for each package length interval; forming the packaging film into successive packages, each package having a respective zipper assembly; filling each package with product; and sealing each filled package. The zipper assembly can be oriented in either a machine direction or a transverse (cross) direction when attached to the packaging film.

In a typical form/fill/seal operation, a continuous supply of thin packaging or bag-making film is fed forwardly of a supply reel. The film is drawn forwardly by a suitable mechanism. As the film is fed forwardly to the form, fill and seal machine, a fastener strip assembly is attached to the inner surface of the film. The fastener strip may be laid directly on the film, but preferably is fed laterally across the upper surface of the film at right angles to the longitudinal edges of the film, or in other words at right angles to the longitudinal formation axis of the film. The fastener strip is provided from a supply reel fed through a guide and into a channel. Suitable means are provided for cutting off a length of fastener strip from the film and the length of the strip will be substantially equal to one-half of the film width. The strip is secured or attached to the film so that only the lower portion, i.e., the flange, of the profiles is secured to the film. The strips are attached at the midpoint of the edges of the film and the lateral portions of the film beyond the ends of the strips are sufficiently long so that they can be folded over the top of the strips.

The foregoing automated process becomes more complex when zipper assemblies with sliders are used as the reclosable plastic fastening means. The machinery for feeding the slider-zipper assemblies to the desired position overlying the thermoplastic film must take account of the different profile and larger dimensions of the slider as compared to the profile and dimensions of the interlocked fastening members of the zipper.

Figure 1:
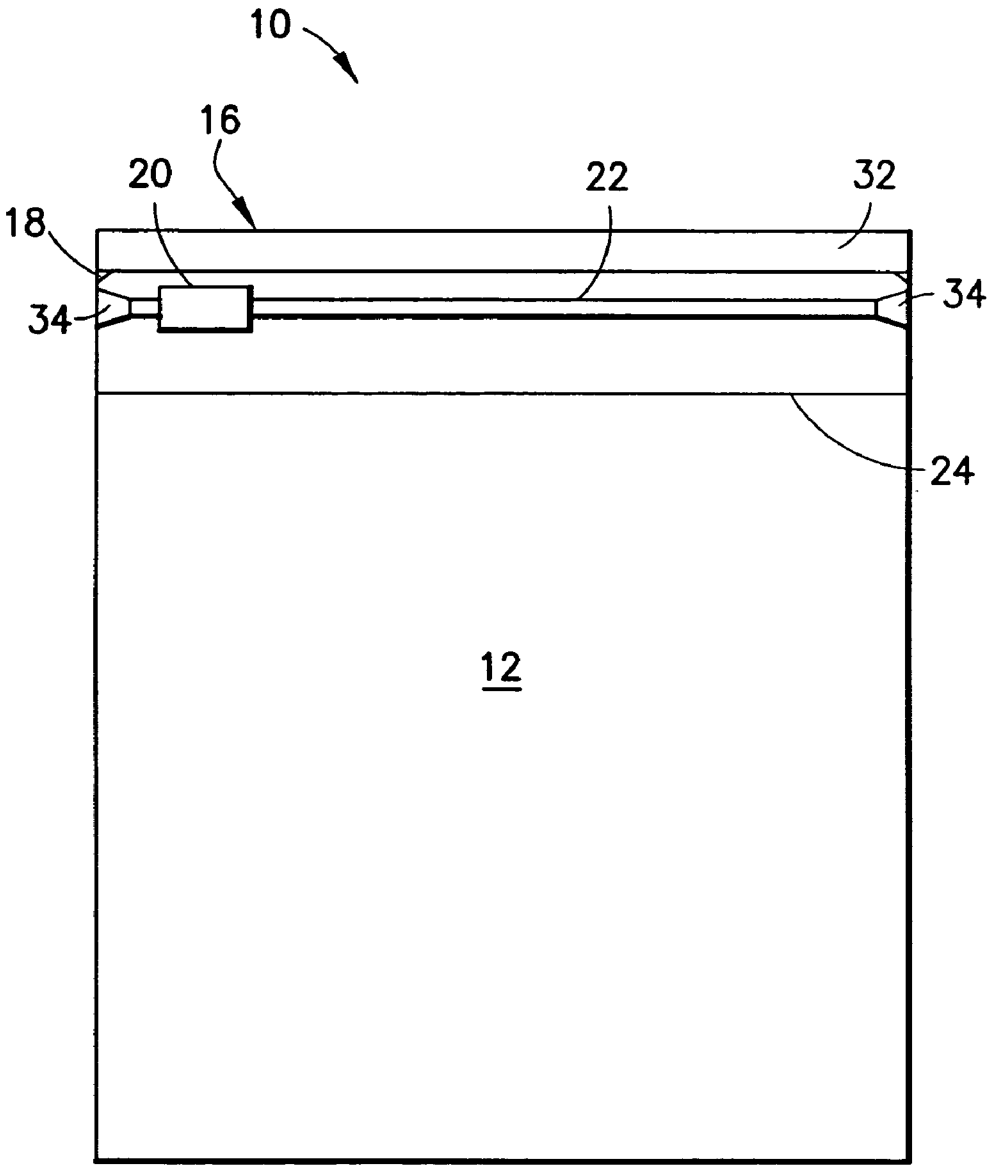
FIG. 1 is a drawing showing a front view of a conventional reclosable package having a slider-zipper assembly installed in the mouth of the package.

Reference will now be made to the drawings in which similar members in different drawings bear the same reference numerals. FIG. 1 depicts a reclosable package 10 comprising a receptacle with a mouth at the top, the receptacle being formed by a front wall 12 and a rear wall (not shown) that is opposite to the front wall. The front and rear walls are typically formed from clear thermoplastic film heat sealed as necessary to form hermetically sealed junctures for the various portions of the package, e.g., along the sides if folded along the bottom or along a central seam and along the bottom if folded along the sides. A zipper 22 comprising a pair of fastener strips having respective interlockable members is provided in the mouth of the receptacle, attached to the front wall 12 and rear wall. A slider 20 is provided on the zipper to facilitate its opening and closing. FIG. 1 shows the slider 20 in a position corresponding to closure of the zipper 22. Moving the slider 20 toward the right-hand side disengages the interlockable members of the zipper and moving the slider back to the closed position shown in FIG. 1 brings the interlockable members of the zipper into full engagement once again. For proper functioning, the interlockable members have spot seals 34 at the ends of the zipper strips. These seals ensure the zipper strips will not come apart during use and provide end stops for the slider 20. The slider-zipper assembly is preferably covered on the consumer side by an enclosed header 16 that is preferably hermetically sealed. The sealed header 16, which provides a tamper-evident feature, comprises front and rear walls that may be integrally formed with or heat sealed to the front and rear walls, respectively, of the receptacle. The numeral 32 in FIG. 1 designates a hard seal, i.e., a seal that is not intended to be broken. The sealed header 16 has respective tear notches 18 formed on each side edge of the header, at which the consumer can initiate tearing off of the sealed header from the package.

It should be appreciated that the front wall of the header 32 and the front wall 12 of the receptacle are shown in FIG. 1 as being made of clear thermoplastic material. Therefore, the slider-zipper assembly is visible through the clear walls and has not been depicted as hidden.

Figure 2:
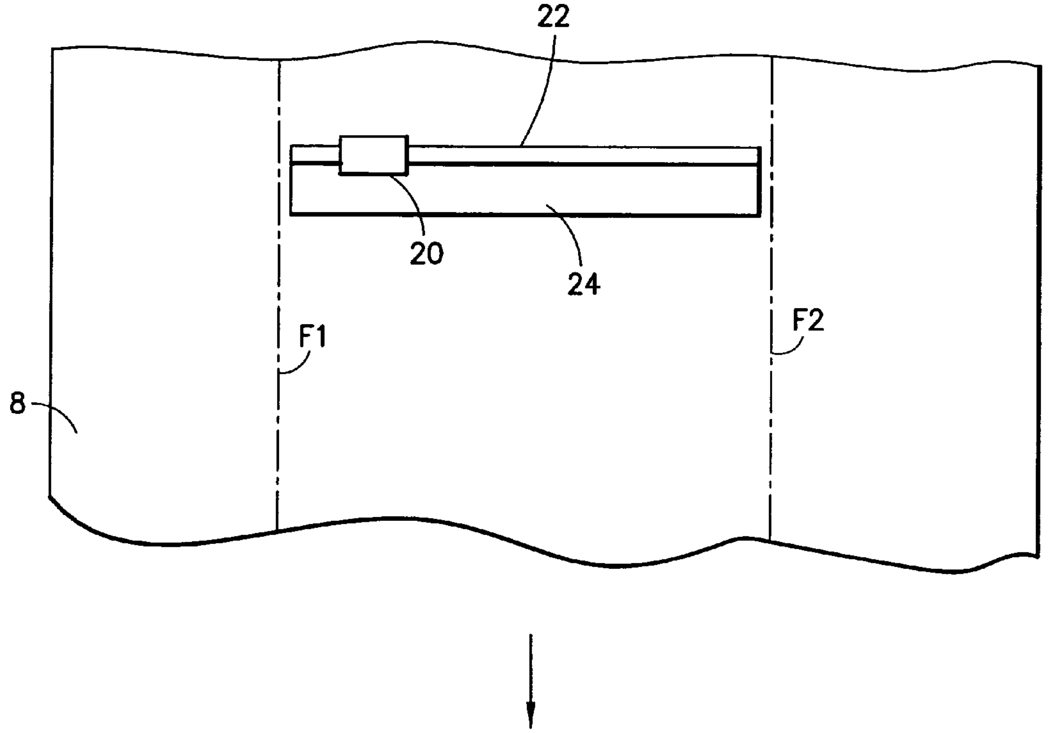
FIG. 2 is a drawing showing a fragmentary top view of a slide-zipper assembly attached to a packaging film and oriented in a transverse direction.

FIG. 2 depicts thermoplastic packaging material 8 with a slider-zipper assembly heat sealed thereon. The slider-zipper assembly comprises a slider 20 and a zipper 22. Preferably the slider-zipper assembly is cut off from the end of a tape or chain of such assemblies and then heat sealed to the thermoplastic film using automated equipment.

Figure 4:
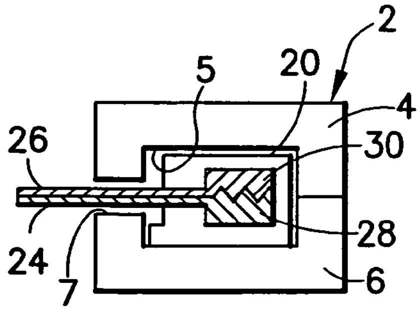
FIG. 4 is a drawing showing a partially sectioned end view of a slider-zipper assembly lying partly within a slider guide comprising upper and lower slider guides in accordance with the preferred embodiment of the invention.

As best seen in FIG. 4, the zipper comprises a first fastener strip comprising a first zipper flange 24 and a first interlockable member 28, and a second fastener strip comprising a second zipper flange 26 and a second interlockable member 30. The first and second interlockable members can be engaged to close the zipper and disengaged to open the zipper. Only zipper flange 24 is visible in FIGS. 1 and 2, with zipper flange 26 being hidden behind zipper flange 24. Referring again to FIG. 2, the flange 26 is attached, e.g., by heat sealing, to the underlying thermoplastic packaging material 8, which may take the form of a thin transparent film of thermoplastic material. Later the packaging material will be folded along fold lines F1 and F2, indicated by dashed lines. The folded portions will be heat sealed to each other to form a wall of the reclosable package. The top portion of this wall will be heat sealed to the zipper flange 24, while the bottom edge of the newly formed wall will be heat sealed to the bottom edge of the opposing wall to form a bottom seal for the reclosable package. When the film is folded along fold lines F1 and F2, the zipper/slider assembly will be part of the sealed header.

Figure 5:
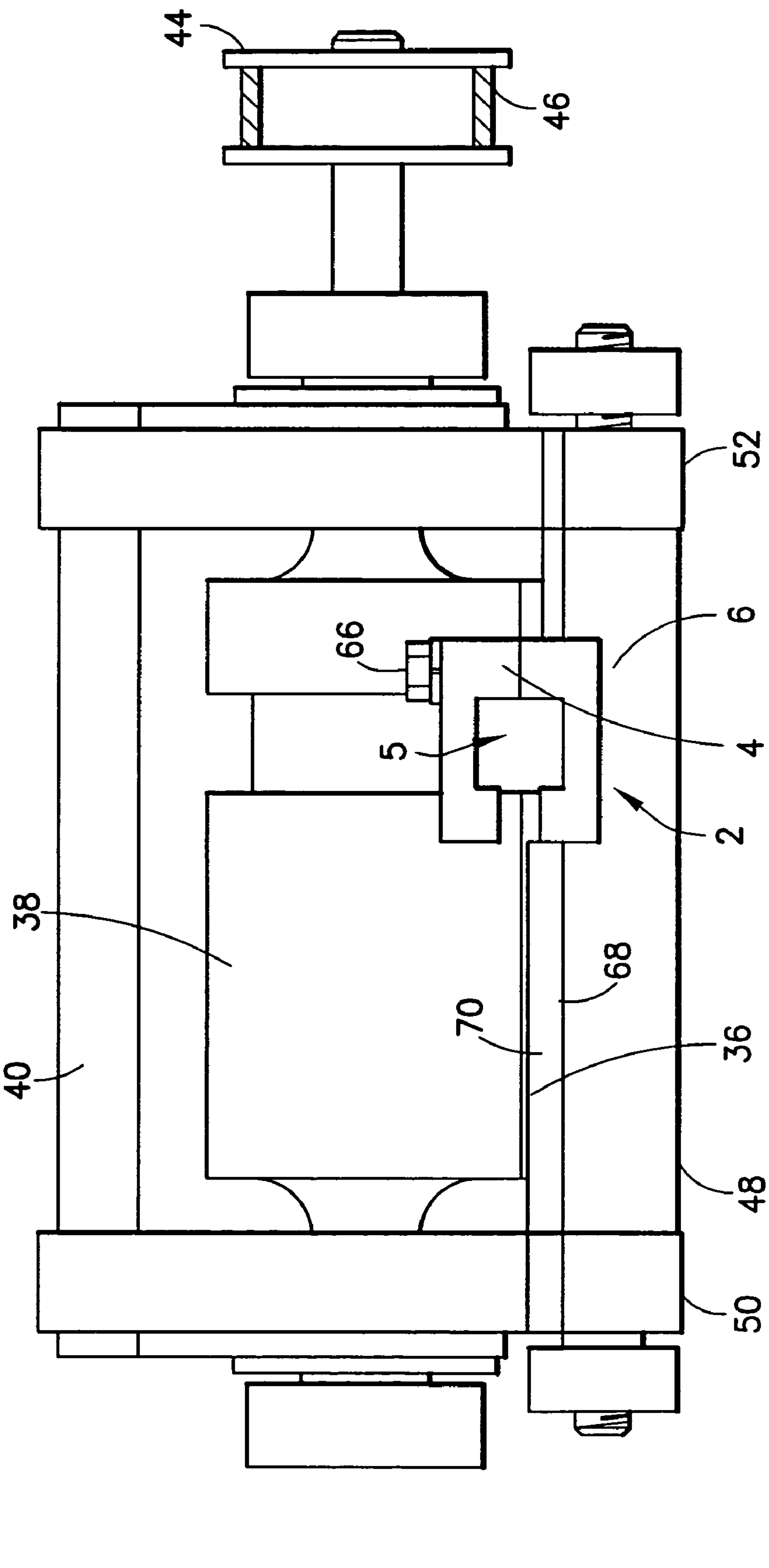
FIG. 5 is a drawing showing a front view of part of a slider-zipper tape drive assembly in accordance with the preferred embodiment of the invention.
Figure 6:
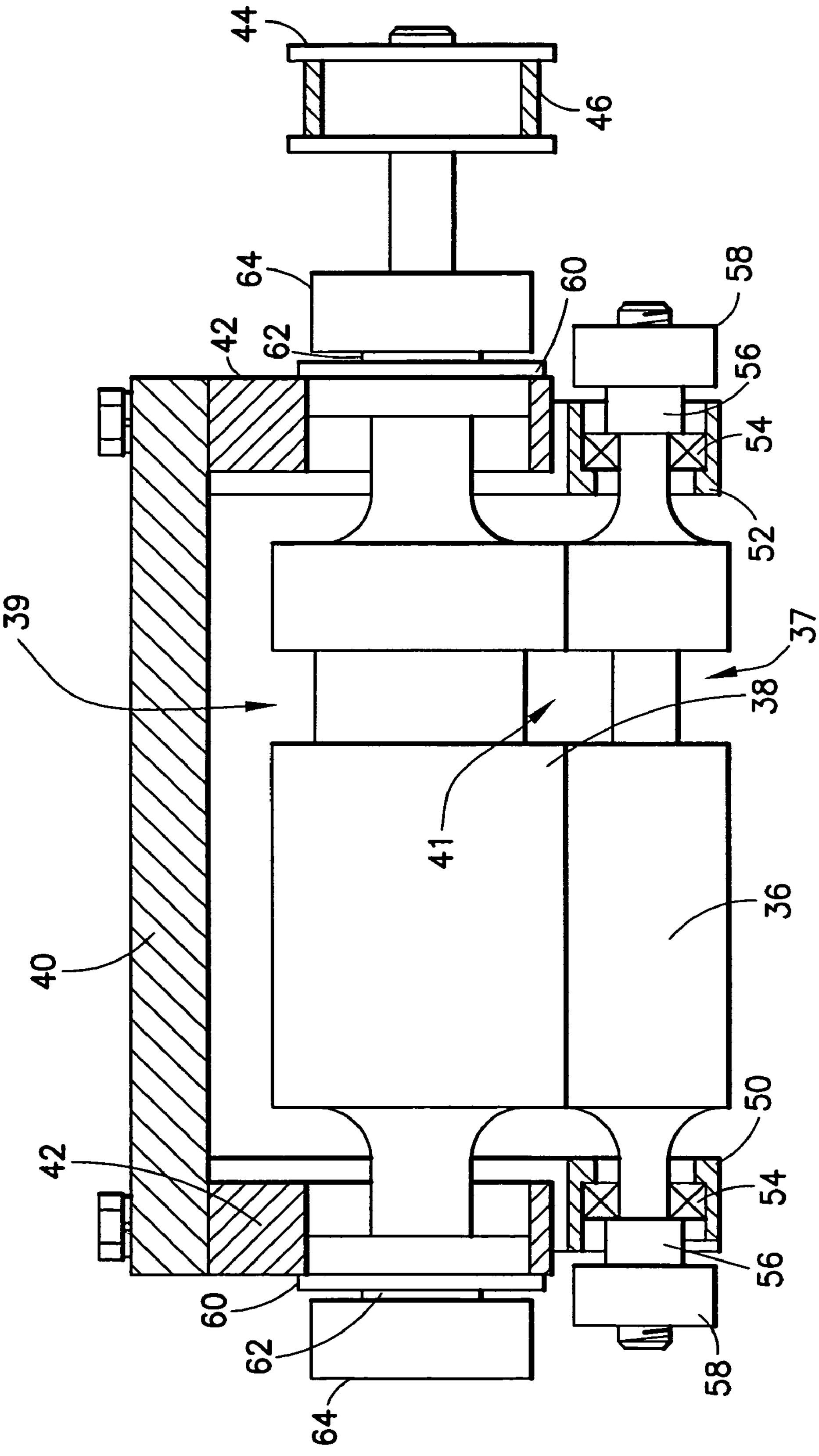
FIG. 6 is a drawing showing a sectional view of the slider-zipper tape drive assembly shown in FIG. 5.

In accordance with the preferred embodiment of the invention, the slider-zipper assembly arrives at the position shown in FIG. 2 via a slider tape drive assembly, shown in FIGS. 5 and 6. The slider tape drive assembly incorporates a slider guide 2. The slider-zipper assemblies are supplied to the automated package manufacturing line in the form of a continuous tape, a part of which is visible in FIG. 3. Initially two continuous fastener strips are formed by a well-known extrusion process. These fastener strips have interlockable members 28, 30 (see FIG. 4) which form a zipper tape when the members are interlocked. The resulting zipper tape is then continuously fed to a shaper (not shown) which crushes or fuses the interlocked members at regularly spaced intervals to form end stops or restraints 34 (see FIG. 3) for the sliders 20. This crushing or fusing also ensures that the zipper halves (i.e., fastener strips) will not come apart during use. After shaping, the tape is continuously fed to a slider insertion device (not shown) which slidably mounts a respective slider 20 onto each segment of the interlocked members 28, 30 lying between successive end stops 34.

The resulting tape can be fed directly to a slider tape drive assembly constructed in accordance with the preferred embodiment of the invention. Alternatively, the resulting tape can be wound on a spool at one location, which spool is then transported to the location of the slider tape drive assembly. The tape is unwound from the spool and then fed to the slider tape drive assembly.

Figure 3:
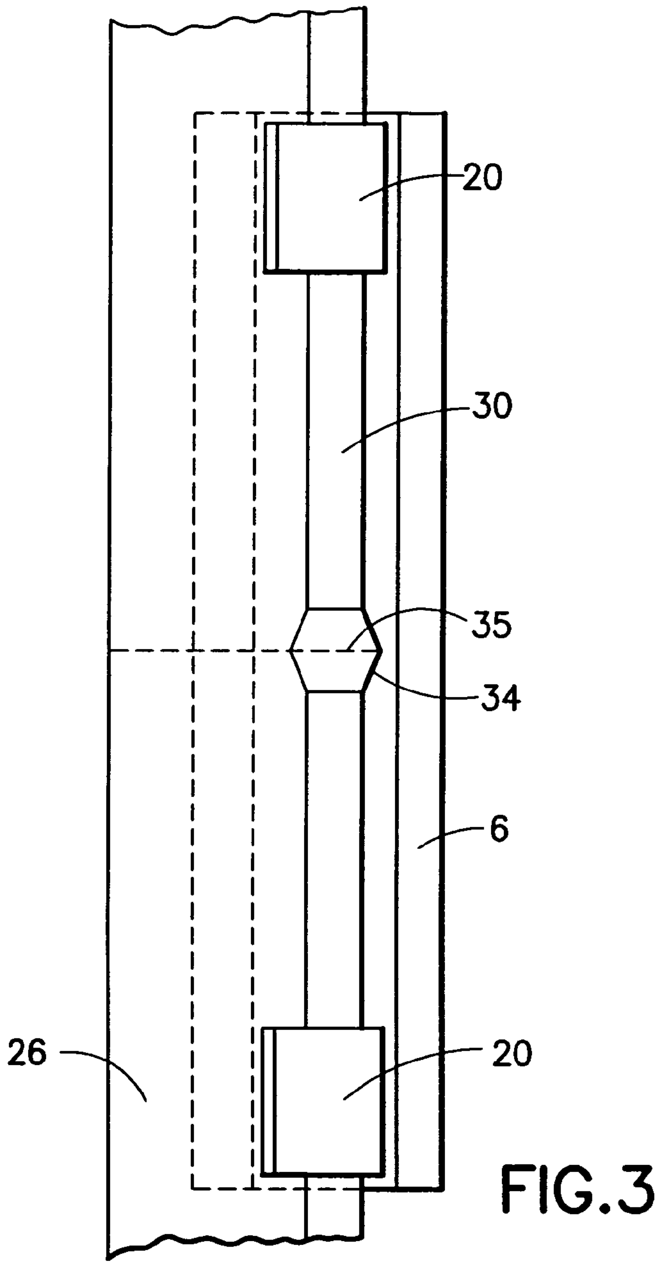
FIG. 3 is a drawing showing a fragmentary top view of a slider-zipper assembly lying partly within a slider guide comprising upper and lower slider guides in accordance with the preferred embodiment of the invention. The upper slider guide has been removed to reveal the sliders and a portion of the zipper tape that lie within the slider guide channel.

In the preferred embodiment, the slider guide 2 is a generally C-shaped structure comprising an upper slider guide 4 and a lower slider guide 6 which are fastened together by a plurality of fasteners (one fastener 66 is shown in FIG. 5) spaced at intervals along the length of the slider guide. The upper and lower slider guides, when fastened together, form a channel 5. The opposing faces of the distal ends of the upper and lower slider guides form an opening 7 in the side of the slider guide that communicates with the channel 5. The channel 5 and opening 7 both run the length of the slider guide 2. The channel 5 has a cross section that allows passage of successive sliders 20 slidably mounted to a sequence of connected slider-zipper assemblies. Sufficient clearance is provided that the sliders move freely along the channel without jamming. Also the opening 7 is disposed and sized to allow portions of the mutually opposing zipper flanges 24, 26 to penetrate and protrude out of the opening 7, as seen in FIG. 4, with sufficient clearance that the flanges can advance freely in the slider guide 2. As best seen in FIG. 3, the slider guide preferably has a length that ensures at least one slider will be located inside the guide channel at all times during the tape feeding operation. Preferably the slider guide is sufficiently long to encompass two sliders 20 when the tape is in certain positions relative to the guide, such as the relative position shown in FIG. 3. The inlet end of the slider guide 2 preferably has chamfered internal surfaces to facilitate entry of each slider into the channel 5.

FIG. 3 shows an uncut tape of connected slider-zipper assemblies occupying the channel inside the slider guide. At regular intervals, the tape of slider-zipper assemblies is advanced a predetermined distance by the drive mechanism (to be described in detail below with reference to FIGS. 5 and 6). The tape of connected slider-zipper assemblies is advanced through the slider guide until the assembly at the end reaches the desired position overlying the packaging material. The slider-zipper assembly at the end of the tape is then cut to separate this assembly from the tape. The separated assembly is then heat sealed to the packaging film. In order to illustrate the location where the slider-zipper assembly tape is cut, a dashed line designated by numeral 35 has been included in FIG. 3, although it should be understood that the cut is made when the cut portion of the tape lies outside the slider guide. As can be seen in FIG. 3, the tape is repeatedly cut along a line which generally bisects the crushed or fused regions that form respective slider stops at adjacent ends of successive slider-zipper assemblies. The cutting and sealing operations may be performed using well-known automated devices.

The tape of connected slider-zipper assemblies is pulled through slider guide by a tape drive mechanism depicted in FIGS. 5 and 6. The tape drive mechanism comprises an idler roller 36 and a nip roller 38 having roller faces that meet squarely to form a nip. The zipper flanges of the tape segment exiting the slider guide are threaded through the nip. The nip roller 38 is rotatably supported by respective flanged bearings 60 mounted to an adjustment plate 40 by means of respective bearing housings 42 at opposite ends of the nip roller 38. The means for adjusting the vertical position of the adjustment plate 40 are not shown. The nip roller 38 is held in position by a pair of spacers 62 and threaded set collars 64. A gearbelt pulley 44 is mounted to the end of the shaft of the nip roller. The pulley is driven by a gearbelt 46 (shown in section in FIGS. 5 and 6), causing the nip roller 38 to rotate. Rotation of the nip roller 38 is controlled by a programmable logic controller (not shown), which controls a servomotor (also not shown), which in turn drives the pulley 44. The programmable logic controller controls the servomotor to rotate the nip roller to the extent needed to feed the tape by the desired number of inches. The pressure exerted by the nip roller 38 on the idler roller 36 in turn causes the idler roller 36 to rotate in the opposite direction. The idler roller 36 is rotatably supported at its ends by respective bearings 54 seated in mounting plates 50 and 52 respectively. The idler roller 36 is held in position by a pair of spacers 56 and threaded set collars 58.

As previously disclosed, the flanges 24 and 26 penetrate and protrude out of the opening 7 formed in the side of the slider guide. When the nip roller is rotated, the friction and compression caused by the surface of the nip roller in contact with the zipper flanges pushes the zipper flanges through the nip, thereby causing the tape segment residing in the slider guide to advance. The nip roller remains stationary while the next slider-zipper assembly is cut off the end of the tape. Then the nip roller is rotated again by the same amount to feed the next tape segment to the cutting station.

In accordance with the preferred embodiment, the idler roller 36 has an annular groove 37 and the nip roller 38 has an annular groove 39, best seen in FIG. 6, which shows the slider guide removed. The groove 37 and 39 preferably are equal in width and are aligned to form a space 41 which is shaped and sized to allow passage therethrough of sliders 20. During tape advancement, one or more sliders 20 inside the slider guide 2 are guided by the internal surfaces forming channel 5. These channel surfaces limit the degree to which the sliders can turn about the longitudinal axis of the channel or any axis perpendicular to the longitudinal axis. The result is that the slider guide maintains each slider in a suitable orientation as it exits the slider guide and enters the tape drive mechanism. Each successive slider exits the slider guide 2 and then passes through space 41 formed by grooves 37 and 39 in the rollers. The slider guide ensures that the tape is in the proper position for passage through the tape drive mechanism. The walls of grooves 37 and 39 also serve to guide each slider as it passes through space 41.

The slider tape drive assembly depicted in FIG. 6 further comprises a guide plate 48 which is positioned forward of the idler roller 36. The lower slider guide 6 is attached to the guide plate 48 by means of fasteners (not shown). The upper slider guide 4 is in turn fastened to the lower slider guide 4 by fasteners 66, as previously described. The guide plate 48 has a beveled surface 68 and a generally horizontal surface 70. The surface 70 guides the zipper flanges toward the roller nip during tape advancement.

While the invention has been described with reference to preferred embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. For example, it should be obvious that the slider guide may be formed as a monolithic piece or may be an assembly having two or more parts. Therefore it is intended that the invention not be limited to the particular embodiment disclosed as the best mode contemplated for carrying out this invention, but that the invention will include all embodiments falling within the scope of the appended claims.

The invention claimed is:

1. A method of manufacture comprising the following steps:

(a) inserting a multiplicity of sliders on a tape made up of a pair of at least partially interlocked profiled zipper strips having mutually opposing extension flanges, said sliders being distributed along a length of said tape, one slider per package-length section of said tape;

(b) placing said tape with sliders inserted thereon so that a first portion of said tape and at least one slider thereon are disposed in a channel of a guideway, with the flanges of said first portion penetrating and protruding out of a longitudinal opening in the guideway;

(c) advancing a second portion of said tape with sliders inserted thereon, said second portion extending from a point upstream of the guideway to a point downstream of the guideway, and including said first portion of said tape inside said channel;

(d) joining the flanges of a package-length distal portion of said tape to film material; and (e) cutting said tape and said film material to sever said distal portion of said tape from the rest of said tape, wherein the channel has a cross-sectional shape that limits turning of a slider about any axis as that slider travels inside the channel during tape advancement, and has a length equal to at least one package length.

2. The method as recited in claim 1, wherein step (b) further comprises threading the flanges of a third portion of said tape through a nip formed by two rollers, said third portion of the tape being disposed upstream of said first portion of said tape, at least one of the rollers exerting a pulling force on said tape during tape advancement.

3. The method as recited in claim 1, further comprising the step of forming a receptacle having an interior volume and a mouth with said distal portion of said tape installed therein.

4. The method as recited in claim 1, further comprising the step of forming slider stops at intervals along the length of said tape prior to steps (b) through (e) being performed.

5. The method as recited in claim 1, wherein step (c) is performed intermittently, while steps (d) and (e) are performed during intervening dwell times between advancements.

6. A method for feeding a tape of slider-zipper assemblies to an applicator, said tape comprising a multiplicity of zipper segments, each of said zipper segments having a slider slidably mounted thereto, comprising the step of passing a portion of said tape through a channel having a cross section that allows passage therethrough of the slider of each successive slider-zipper assembly, said channel being formed to limit turning of said slider about any axis.

7. The method as recited in claim 6, wherein at least one slider resides within said channel at all times during said passing step.

8. An automated method for applying slider-zipper assemblies to a thermoplastic film, comprising the steps of:

forming slider stops at intervals along the length of a zipper tape;

mounting a respective slider along a respective length of said zipper tape lying between a respective pair of successive slider stops to form a tape of slider-zipper assemblies;

passing a portion of said tape through a channel having a cross section that allows passage therethrough of the slider of each successive slider-zipper assembly, said channel being formed to limit turning of said slider about any axis;

cutting off a slider-zipper assembly from said tape; and attaching said slider-zipper assembly to said thermoplastic film.

9. The method as recited in claim 8, wherein at least one slider resides within said channel at all times during said passing step.

10. The method as recited in claim 8, further comprising the step of passing flange portions of said zipper tape through a nip between two rollers and driving the rotation of one of said rollers in a direction to pull said tape of slider-zipper assemblies through said channel.

* * * * *